US010586624B2

(12) United States Patent
Tefft et al.

(10) Patent No.: US 10,586,624 B2
(45) Date of Patent: Mar. 10, 2020

(54) CONTROL OF IMAGING ASSEMBLY WITH INTERCHANGEABLE RADIATION SHIELDING

(71) Applicant: H3D, Inc., Ann Arbor, MI (US)

(72) Inventors: David Price Tefft, Dexter, MI (US); William Robert Kaye, Ann Arbor, MI (US); Weiyi Wang, Ann Arbor, MI (US); Yvan Anders Boucher, Ann Arbor, MI (US); Jason Michael Jaworski, Ann Arbor, MI (US); Christopher Glenn Wahl, Ann Arbor, MI (US)

(73) Assignee: H3D, Inc., Ann Arbor, MI (US)

( * ) Notice: Subject to any disclaimer, the term of this patent is extended or adjusted under 35 U.S.C. 154(b) by 9 days.

(21) Appl. No.: 15/664,479

(22) Filed: Jul. 31, 2017

(65) Prior Publication Data

US 2019/0037142 A1    Jan. 31, 2019

(51) Int. Cl.
*G21K 1/02*    (2006.01)
*G21K 1/10*    (2006.01)
(Continued)

(52) U.S. Cl.
CPC .............. *G21K 1/02* (2013.01); *G01T 1/2914* (2013.01); *G01T 3/006* (2013.01); *G01T 3/02* (2013.01);
(Continued)

(58) Field of Classification Search
CPC ............ H04N 5/23296; H04N 5/2251; H04N 5/2252; H04N 5/22521; H04N 5/2253; H04N 5/2254; H04N 2201/0079; H04N 2201/02493; H04N 2201/02495; H04N 2201/02497; H04N 2201/03166; H04N 1/00997; H04N 3/02; H04N 3/09; G01T 1/16; G01T 1/169; G01T 1/29; G01T 1/2914; G01T 1/2921; G01T 1/2928;
(Continued)

(56) References Cited

U.S. PATENT DOCUMENTS 2,942,109 A * 6/1960 Bell ........................ G01T 1/161
250/367
3,040,175 A * 6/1962 Kern ........................ G01T 1/20
250/369
(Continued)

*Primary Examiner* — Twyler L Haskins
*Assistant Examiner* — Akshay Trehan
(74) *Attorney, Agent, or Firm* — Quinn IP Law

(57) ABSTRACT

Disclosed herein are an imaging assembly and a method of controlling the imaging assembly. The assembly includes a housing having a sensor configured to detect radiation impinging on the sensor from a plurality of directions. The assembly may employ one or more shields, including a first internal shield having a first annular body between a first inner surface and a first outer surface. The first internal shield is configured to be placed in the housing such that the first inner surface at least partially surrounds the sensor. When the first internal shield is placed in the housing, the sensor is configured to receive a first central zone radiation through a first field of view, and a first peripheral zone radiation through a first peripheral view. The assembly is configured to provide at least one of a controllable field of view and reduced background contamination in an image domain.

20 Claims, 5 Drawing Sheets

(51) Int. Cl.
  *G01T 1/29* (2006.01)
  *G01T 3/02* (2006.01)
  *H04N 5/225* (2006.01)
  *G01T 3/00* (2006.01)
  *H04N 5/232* (2006.01)

(52) U.S. Cl.
  CPC ............. *G21K 1/10* (2013.01); *H04N 5/2252* (2013.01); *H04N 5/2253* (2013.01); *H04N 5/2254* (2013.01); *H04N 5/23296* (2013.01)

(58) Field of Classification Search
  CPC ... G01T 1/2935; G01T 1/2907; G01T 1/2942; G01T 1/295; G01T 1/2964; G01T 1/2971; G01T 1/2978; G01T 1/2985; G21K 1/02; G21K 1/025; G21K 1/046; G21K 1/10; A61B 6/06; A61B 6/08; A61B 6/42; A61B 6/4208; A61B 6/4258; A61B 6/44
  USPC ...... 348/373–375; 250/208.1; 378/98.8, 142, 378/147–153
  See application file for complete search history.

(56) References Cited

U.S. PATENT DOCUMENTS

| | | | | |
|---|---|---|---|---|
| 3,407,300 | A * | 10/1968 | Hansen | G21K 1/025 378/149 |
| 3,936,646 | A * | 2/1976 | Jonker | G21K 1/025 378/148 |
| 4,348,591 | A * | 9/1982 | Wunderlich | G21K 1/02 250/363.01 |
| 4,476,385 | A * | 10/1984 | Wunderlich | G21K 1/02 250/303 |
| 4,959,547 | A * | 9/1990 | Carroll | G01T 1/161 250/336.1 |
| 5,175,434 | A * | 12/1992 | Engdahl | G01T 1/2018 250/363.02 |
| 6,031,892 | A * | 2/2000 | Karellas | A61B 6/06 250/370.09 |
| 6,125,166 | A * | 9/2000 | Takeo | A61B 6/4241 378/62 |
| 6,373,066 | B1 * | 4/2002 | Penn | G01T 3/02 250/363.02 |
| 9,020,101 | B2 * | 4/2015 | Omote | H01J 35/12 378/143 |
| 9,230,354 | B2 * | 1/2016 | O'Connor | A61B 6/482 |
| 9,291,719 | B1 * | 3/2016 | Immel | G01T 1/08 |
| 9,953,463 | B2 * | 4/2018 | Joung | G06T 11/006 |
| 2007/0145281 | A1 * | 6/2007 | Ben-Haim | G01T 1/1648 250/370.09 |
| 2014/0301535 | A1 * | 10/2014 | Williams | G01N 23/20066 378/87 |
| 2014/0339443 | A1 * | 11/2014 | Mu | G21K 1/02 250/505.1 |
| 2015/0282773 | A1 * | 10/2015 | Soluri | A61B 6/06 378/98 |
| 2015/0338533 | A1 * | 11/2015 | De Toro | G01T 1/2978 250/394 |
| 2015/0379699 | A1 * | 12/2015 | Takeuchi | G01T 1/1647 348/77 |
| 2016/0189921 | A1 * | 6/2016 | Sotirelis | G21K 1/02 250/394 |
| 2017/0322327 | A1 * | 11/2017 | Boardman | G21K 1/02 |
| 2019/0029614 | A1 * | 1/2019 | Choi | A61B 6/00 |

* cited by examiner

CONTROL OF IMAGING ASSEMBLY WITH INTERCHANGEABLE RADIATION SHIELDING

STATEMENT REGARDING FEDERALLY-SPONSORED RESEARCH OR DEVELOPMENT

This invention was made with Government support under Agreement No. DE-SC0011962, awarded by the United States Department of Energy. The United States Government may have certain rights in this invention.

INTRODUCTION

The present disclosure relates generally to control of an imaging assembly with shielding. Sources emitting radiation may be found in a variety of settings, including but not limited to, power plants and nuclear medicine departments. Multi-directional sensors, which are sensitive to radiation emanating from all directions, may be employed to pinpoint the location of a source of interest. However, the presence of one or more background sources other than the source of interest may contaminate the data and make it difficult to pinpoint the location of the source of interest. Removing the contaminating source(s) may be impossible in many cases. Additional difficulties arise if the background sources emit radiation at the same energy as the source of interest.

SUMMARY

Disclosed herein are an imaging assembly and a method of controlling the imaging assembly. The assembly includes a housing having a sensor configured to detect radiation impinging on the sensor from a plurality of directions. The sensor is sensitive to the spatial origin or position of the radiation detected. The assembly may employ one or more shields, including a first internal shield having a first annular body between a first inner surface and a first outer surface. The first internal shield is configured to be placed in the housing such that the first inner surface at least partially surrounds the sensor. When the first internal shield is placed in the housing, the sensor is configured to receive a first central zone radiation through a first field of view, and a first peripheral zone radiation through a first peripheral view. The assembly is configured to provide at least one of a controllable field of view and reduced background contamination in an image domain.

In accordance with a first embodiment, the assembly may be operated with a second internal shield, interchangeable with the first internal shield. In other words, only one of the first and second internal shields may be placed in the housing at a time. The second internal shield has a second annular body between a second inner surface and a second outer surface and is configured to be placed in the housing such that the second inner surface at least partially surrounds the sensor when the second internal shield is placed in the housing. When the second internal shield is placed in the housing, the sensor is configured to receive a second central zone radiation through a second field of view and a second peripheral zone radiation through a second peripheral view. The second field of view is smaller than the first field of view.

The sensor is configured to receive the first peripheral zone radiation after it travels through the first annular body. The first outer surface is tapered relative to the first inner surface such that the first peripheral zone radiation travels a first fixed distance ($d_1$) through the first annular body. The sensor is configured to receive the second peripheral zone radiation after it travels through the second annular body. The second outer surface of the second internal shield is tapered relative to the second inner surface such that the second peripheral zone radiation travels a second fixed distance ($d_2$) through the second annular body. The second fixed distance ($d_2$) is greater than the first fixed distance ($d_1$).

The first internal shield defines a first edge line connecting an outermost edge point of the first outer surface and the sensor. The first internal shield defines a first normal line extending from the sensor and perpendicular relative to the first inner surface. The first field of view extends inside the first edge line and the first peripheral view extends between the first edge line and the normal line.

The second internal shield defines a second edge line connecting an outermost edge point of the second outer surface and the sensor. The second internal shield defines a second normal line extending from the sensor and perpendicular relative to the second inner surface. The second field of view extends inside the second edge line and the second peripheral view extends between the second edge line and the normal line.

The assembly may include a removable sleeve having a sleeve annular body between a sleeve inner surface and a sleeve outer surface. The removable sleeve is configured to be placed over the first internal shield such that the sleeve inner surface is adjacent to the first outer surface. The removable sleeve is composed of a non-attenuating material. The first inner surface defines a first inner diameter ($ID_1$) and the second inner surface defines a second inner diameter ($ID_2$). The sleeve, the first internal shield and the second internal shield define a sleeve lateral width (L), a first shield width ($W_1$) and a second shield width ($W_2$), respectively. A first summation ($S_1=ID_1+2L+2W_1$) of the first inner diameter ($ID_1$), twice the sleeve lateral width and twice the first shield width is equal to a second summation ($S_2=ID_2+2W_2$) of the second inner diameter ($ID_2$) and twice the second shield width ($S_1=S_2$).

The assembly may include a dual-function fixed shield operatively connected to the sensor and configured to at least partially attenuate a back radiation striking the dual-function fixed shield. A first temperature regulator may be operatively connected to the sensor and configured to maintain the sensor at a predefined critical temperature. The dual-function fixed shield is configured to conduct heat away from the first temperature regulator. A second temperature regulator may be operatively connected to the first temperature regulator.

In accordance with a second embodiment, the one or more shields may include a field of view (FOV) blocker positioned in the housing such that a combination of the first internal shield and the FOV blocker provides shielding in all directions. The one or more shields may include a field of view (FOV) adjuster having an opening defined by interior walls and positioned in the housing such that a combination of the first internal shield and the FOV adjuster limits the first field of view to an FOV angle. The FOV adjuster may be composed of tungsten or an alloy of tungsten. The interior walls of the FOV adjuster may be shaped as an hourglass.

Referring now to the method of controlling the imaging assembly, the first internal shield is positioned in the housing. A first image is generated with the first internal shield placed in the housing. In accordance with a first embodiment of the method, the first internal shield is removed and a second internal shield is placed in the housing. The assembly is re-positioned based at least partially on the first image. A second image is generated with the second internal shield in the housing such that the second field of view is smaller than the first field of view. Optionally, prior to generating the first image, an initial image with no shield in the housing may be generated.

In accordance with a second embodiment of the method, a field of view (FOV) blocker is positioned in the housing such that a combination of the first internal shield and the FOV blocker provides shielding in all directions. A first image of a scene is generated with the FOV blocker and the first internal shield in place. The FOV blocker is removed and a second image of the scene is generated with the first internal shield but not the FOV blocker. The first and the second images may be divided into respective bins having respective numeric values. A third image is generated by subtracting the second image from the first image.

Alternatively, the FOV blocker may be removed and a field of view (FOV) adjuster may be positioned in the housing. The FOV adjuster has an opening defined by interior walls such that a combination of the first internal shield and the FOV adjuster limits the first field of view to an FOV angle. A second image of the scene is generated with the FOV adjuster and the first internal shield but not the FOV blocker. A third image is generated by subtracting the second image from the first image. The FOV adjuster and the FOV blocker may each be composed of tungsten or an alloy of tungsten. The interior walls of the FOV adjuster may be shaped as an hourglass.

The above features and advantages and other features and advantages of the present disclosure are readily apparent from the following detailed description of the best modes for carrying out the disclosure when taken in connection with the accompanying drawings.

DETAILED DESCRIPTION

Figure 1:
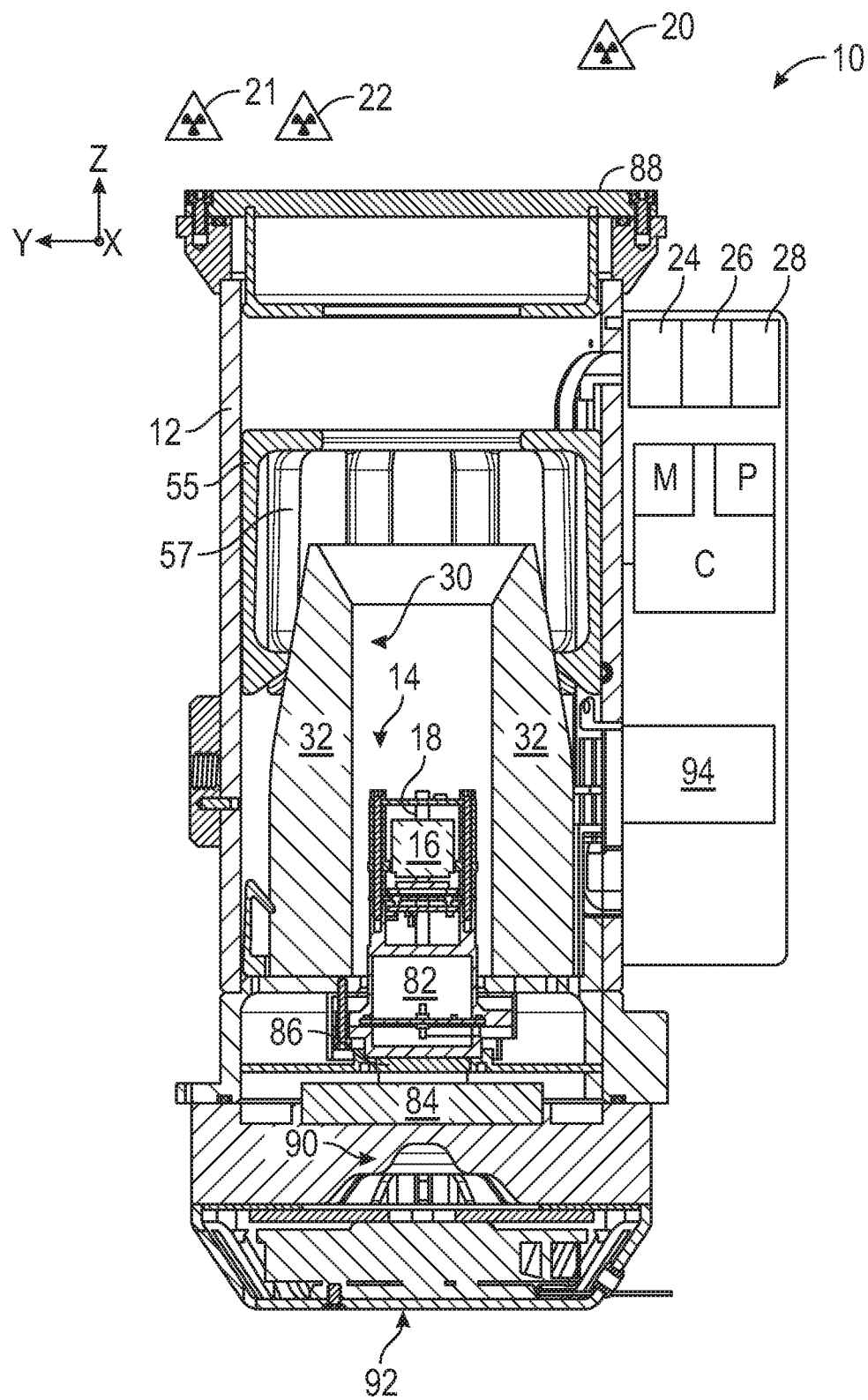
FIG. 1 is a schematic partly sectional illustration of an imaging assembly.

Referring to the drawings, wherein like reference numbers refer to like components, FIG. 1 schematically illustrates an imaging assembly 10 having a housing 12. The assembly 10 may take many different forms and include multiple and/or alternate components and facilities. The assembly 10 includes a housing 12 having a cavity 14. A sensor 16 is positioned in the cavity 14 and configured to detect radiation emanating from a plurality of directions. The radiation may include, but is not limited to, gamma rays. The sensor 16 may utilize Compton scattering to determine the spatial origin of the observed radiation. The sensor 16 is configured to be sensitive to the position of the detected radiation and may be configured to localize radiation sources in all directions simultaneously. In one example, the sensor 16 includes a cadmium zinc telluride (CdZnTe) compound and a conductive sponge 18 configured to apply an electrical potential on the cadmium zinc telluride (CdZnTe) compound. Any sensor technology known to those skilled in the art may be employed.

Referring to FIG. 1, the sensor 16 is configured to obtain position-sensitive radiation data of at least one source of interest 20. However, the presence of background sources, such as first background source 21 and second background source 22, may contaminate the data and make it difficult to pinpoint the location of the source of interest 20. The source of interest 20 may be a gamma-emitting radioisotope. The source of interest 20 may emit alpha, beta and electromagnetic radiation, neutrons or any other type of radiation phenomenon known to those skilled in the art. In one example, the source of interest 20 is gamma-emitting Cesium-137.

The assembly 10 may include an optical camera 24 configured to capture an optical image of the source of interest 20. The assembly 10 may include a laser range finder 26 configured to determine a distance to a target, for example, by sending a laser pulse in a narrow beam towards the target and measuring the time taken by the pulse to be reflected off the target and returned back. The assembly 10 may include a spectrometer 28 that detects distribution of intensity (counts) of radiation versus the energy of the respective radiation.

Referring to FIG. 1, the assembly 10 includes a controller C operatively connected to the sensor 16 and configured to control the operation of the sensor 16. Referring to FIG. 1, the controller C includes at least one processor P and at least one memory M (or any non-transitory, tangible computer readable storage medium) for facilitating the acquisition and display of acquired images. The memory M can store controller-executable instruction sets, and the processor P can execute the controller-executable instruction sets stored in the memory M. It is to be appreciated that the assembly 10 may include other associated circuitry or electronics (not shown). For instance, the circuitry may include a photomultiplier tube, a silicon photodiode, other photon-electron conversion devices, high voltage supply, preamplifier, amplifier and analog to digital converter (ADC). A display device (not shown), such as a tablet, may connect wirelessly to the controller C via a Wi-Fi connection for real-time display of the images some distance away.

In accordance with a first embodiment, the assembly 10 may be configured to operate in at least three modes: a first mode with a first internal shield 30 (shown in FIG. 2) placed in the housing 12; a second mode with a second internal shield 60 (shown in FIG. 3); and a third mode with no shield in place. Stated differently, only one of the first and second internal shields 30, 60 (or none) may be placed in the housing 12 at a time. The first and second internal shields 30, 60 may be composed of an alloy having both tungsten and copper.

Figure 2:
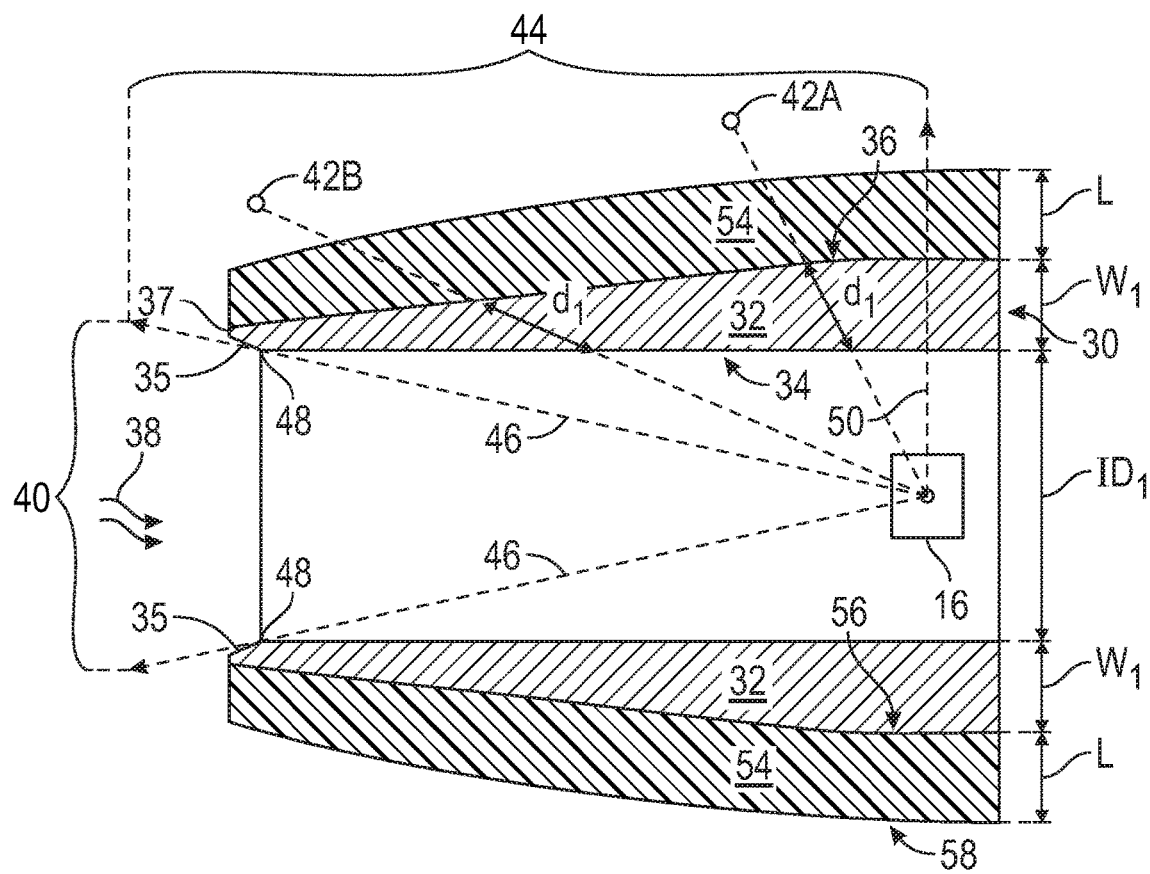
FIG. 2 is an example of a first internal shield employable in the assembly of FIG. 1.

Referring now to FIG. 2, the first internal shield 30 has a first annular body 32 between a first inner surface 34 and a first outer surface 36. The first internal shield 30 is configured to be placed (in the housing 12) such that the first inner surface 34 at least partially surrounds the sensor 16. When the first internal shield 30 is placed in the housing 12, the sensor 16 is configured to receive a first central zone radiation 38 through a first field of view 40, and a first peripheral zone radiation 42A, 42B through a first peripheral view 44. The first internal shield 30 defines a slanted portion 35 contiguous with the inner surface 34. The slanted portion 35 may be directly adjacent to an end 37.

Referring to FIG. 2, the first field of view 40 extends inside a first edge line 46 connecting an outermost edge point 48 of the first inner surface 34 and the sensor 16. The first peripheral view 44 extends between the first edge line 46 and a first normal line 50 extending from the sensor 16 and perpendicular relative to the first inner surface 34. The first peripheral zone radiation 42A, 42B reaches the sensor 16 after travelling through the first annular body 32. The first outer surface 36 is tapered relative to the first inner surface 34 such that the first peripheral zone radiation 42A, 42B travels a first fixed distance ($d_1$) through the first annular body 32.

Referring to FIG. 2, the first internal shield 30 is employed with a removable sleeve 54 having a sleeve annular body (also labeled 54) between a sleeve inner surface 56 and a sleeve outer surface 58. The removable sleeve 54 is configured to be placed over the first internal shield 30 such that the sleeve inner surface 56 is adjacent to the first outer surface 36. The removable sleeve 54 is composed of a non-attenuating material. Alternatively, referring to FIG. 1, a bracket 55 may be employed to retain or secure the first internal shield 30 with respect to the housing 12. The bracket 55 may include a plurality of ribs 57 separated by gaps.

Figure 3:
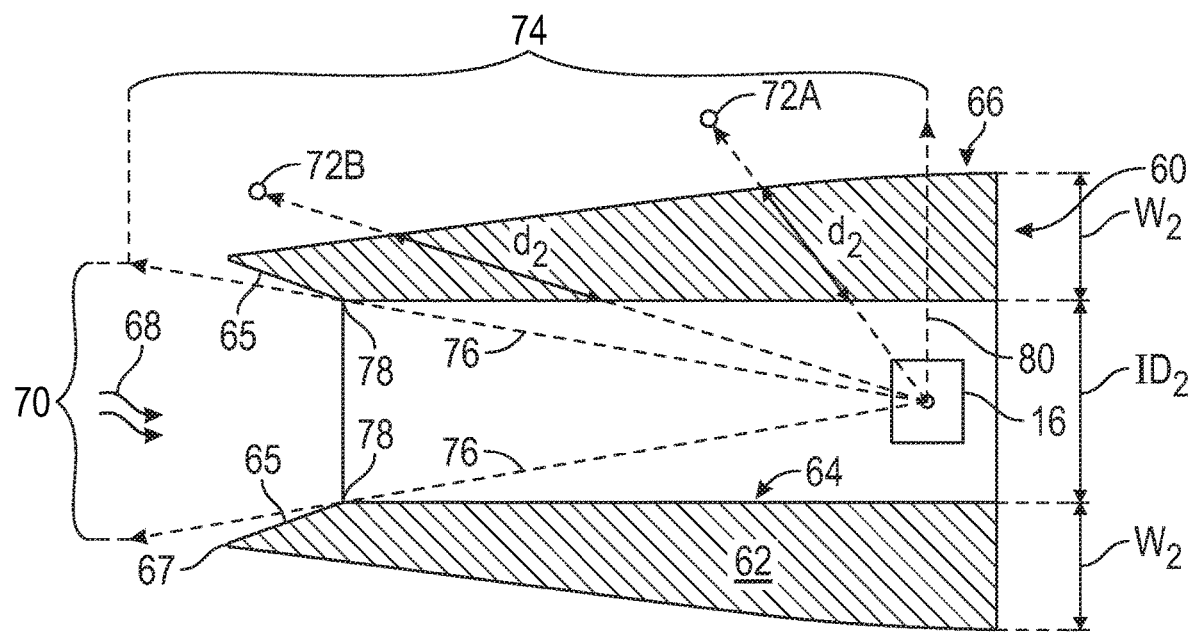
FIG. 3 is an example of a second internal shield employable in the assembly of FIG. 1.

Referring to FIG. 3, the second internal shield 60 has a second annular body 62 between a second inner surface 64 and a second outer surface 66. The second internal shield 60 may be composed of an alloy having both tungsten and copper. The second inner surface 64 at least partially surrounds the sensor 16 when the second internal shield 60 is placed in the housing 12. The second internal shield 60 defines a slanted portion 65 contiguous with the inner surface 64. The slanted portion 65 may be directly adjacent to an end 67.

Referring to FIG. 3, the sensor 16 is configured to receive a second central zone radiation 68 through a second field of view 70 and a second peripheral zone radiation 72A, 72B through a second peripheral view 74 when the second internal shield 60 is placed in the housing 12. The second field of view 70 is smaller than the first field of view 40.

Referring to FIG. 3, the second field of view 70 extends inside a second edge line 76 connecting an outermost edge point 78 of the second inner surface 64 and the sensor 16. The second peripheral view 74 extends between the second edge line 76 and a second normal line 80 extending from the sensor 16 and perpendicular relative to the second inner surface 64.

Referring to FIG. 3, the second peripheral zone radiation 72A, 72B reaches the sensor 16 after travelling through the second annular body 62. The second outer surface 66 of the second internal shield 60 is tapered relative to the second inner surface 64 such that the second peripheral zone radiation 72A, 72B travels a second fixed distance ($d_2$) through the second annular body 62. The second fixed distance ($d_2$) is greater than the first fixed distance ($d_1$). Accordingly, the second internal shield 60 is configured to attenuate more of its second peripheral zone radiation 72A, 72B (relative to the first internal shield 30 attenuating the first peripheral zone radiation 42A, 42B).

Referring to FIG. 2, the first inner surface 34, the removable sleeve 54, and the first internal shield 30 define a first inner diameter ($ID_1$), a sleeve lateral width (L) and a first shield width ($W_1$), respectively. Referring to FIG. 3, the second inner surface 64 and the second internal shield 60 define a second inner diameter ($ID_2$) and a second shield width ($W_2$), respectively. In the embodiment shown, a first summation ($S_1$) of the first inner diameter ($ID_1$), twice the sleeve lateral width (L) and twice the first shield width ($W_1$) is equal to a second summation ($S_2$) of the second inner diameter ($ID_2$) and twice the second shield width ($W_2$). In other words, $S_1=ID_1+2W_1+2L=S_2=ID_2+2W_2$. In the embodiment shown, the second shield width ($W_2$) is greater than the first shield width ($W_1$). It is to be appreciated that the figures are not to scale.

Referring now to FIG. 1, a first temperature regulator 82 may be operatively connected to the sensor 16 and configured to maintain the sensor 16 at a predefined critical temperature. The assembly 10 may include a dual-function fixed shield 84 operatively connected to the sensor 16. First, the dual-function fixed shield 84 is configured to at least partially attenuate the radiation, such as back radiation outside of the respective first and second peripheral views 44, 74, striking the dual-function fixed shield 84. Second, the dual-function fixed shield 84 is configured to conduct heat away from the first temperature regulator 82. A second temperature regulator 86 may be operatively connected to the first temperature regulator 82. Referring to FIG. 1, the assembly 10 may further include a front cover 88, a fan 90 configured to dissipate heat, a rear cover 92 and an energy storage device 94 (such as a battery).

Figure 4:
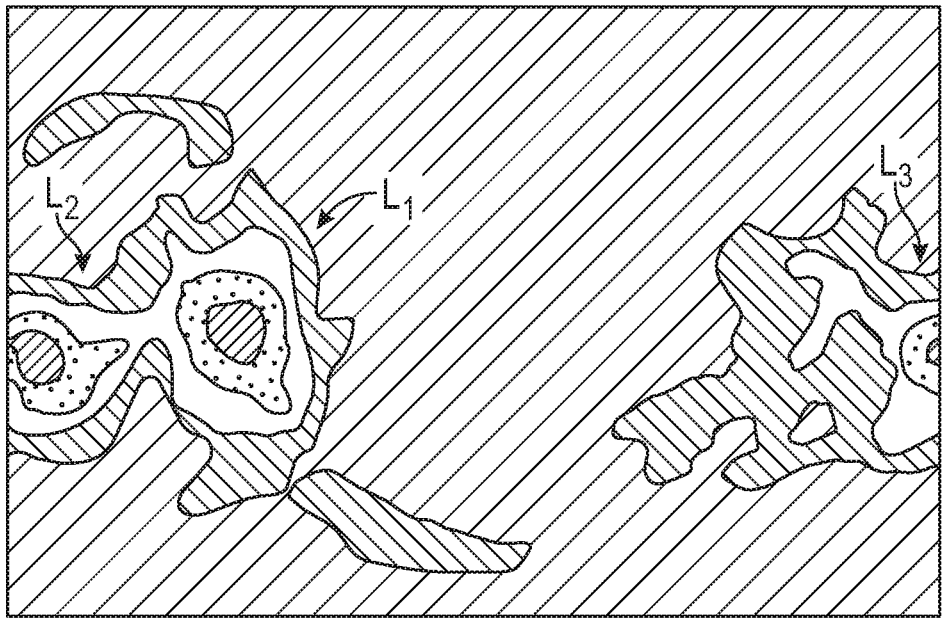
FIG. 4 is an example first image obtained with the assembly of FIG. 1 with the first internal shield, with polar angle (PA) on the vertical axis and azimuthal angle (AA) on the horizontal axis.
Figure 5:
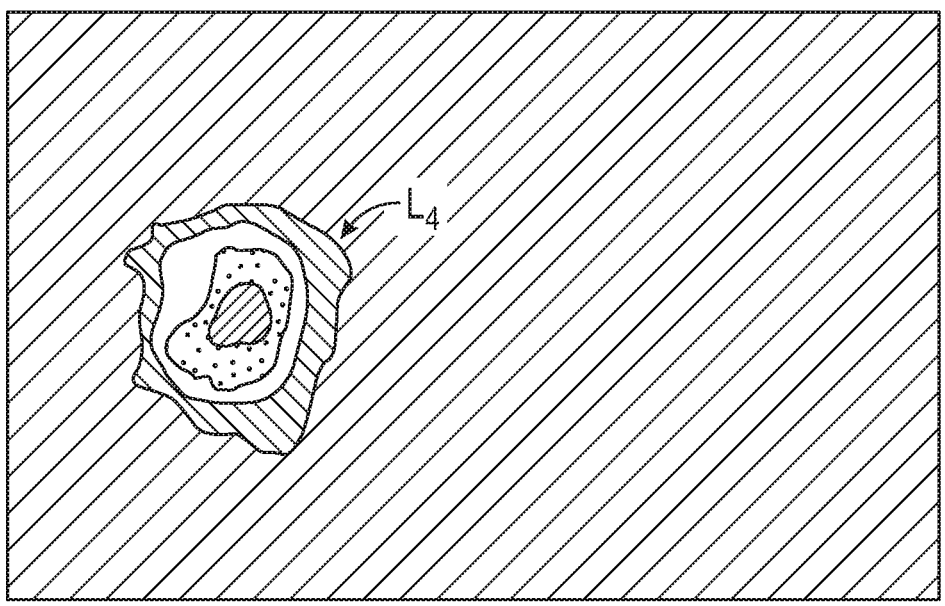
FIG. 5 is an example second image obtained with the assembly of FIG. 1 with the second internal shield, with polar angle (PA) on the vertical axis and azimuthal angle (AA) on the horizontal axis.

Referring to FIGS. 4-5, examples of a first image and a second image obtained with the first and second internal shields 30, 60, respectively, are shown. Each point in the first and second images is specified by its polar angle (PA) measured from a fixed direction, and an azimuth angle (AA) of its orthogonal projection on the XY plane (axes shown in FIG. 1). The azimuth angle (AA) is measured from a fixed reference direction (X-axis, out of the page in FIG. 1) on the XY plane. In the embodiment shown, the polar angle (PA) extends between 0° and 180° while the azimuth angle (AA) extends between 0° and 360°.

Figure 6:
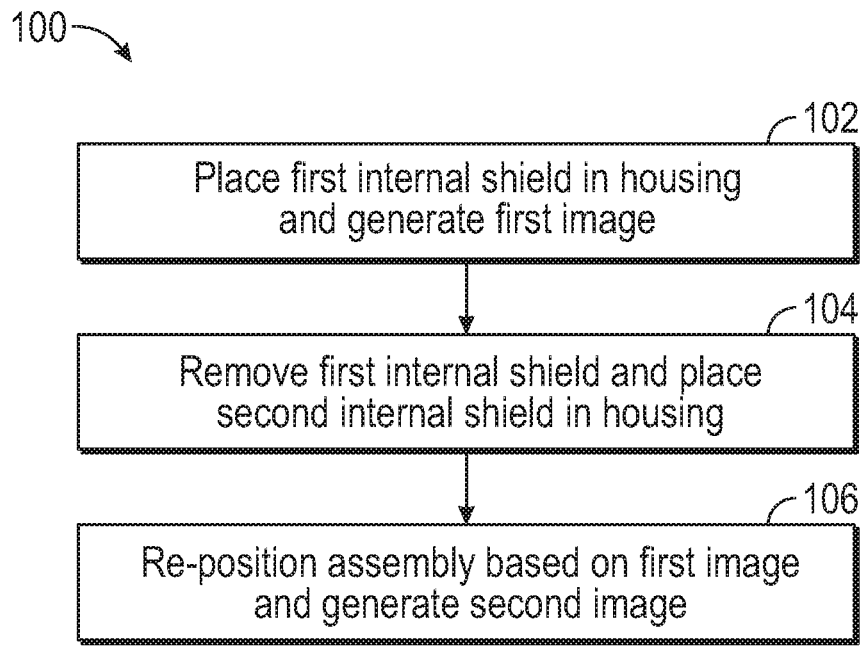
FIG. 6 is a flowchart for a method of controlling the assembly of FIG. 1, in accordance with a first embodiment.

Referring to FIG. 6, in accordance with a first embodiment, a method 100 of controlling the assembly 10 is shown. The method 100 need not take place in the order described and some steps may be omitted. Per block 102 of FIG. 6, the first internal shield 30 is placed in the housing 12 such that the first inner surface 34 at least partially surrounds the sensor 16 (see FIG. 1) and a first image is generated with the first internal shield 30 placed in the housing 12.

As noted above, an example first image is shown in FIG. 4. Referring to the legends on the right side of FIGS. 4-5, the region of highest intensity (I1) is shown with a hatched (forward-slash) pattern. The region of second-highest intensity (I2) is shown with a dotted pattern. The region of third-highest intensity (I3) is shown as blank (no pattern). The region of fourth-highest intensity (I4) is shown with a hatched (back-slash) pattern. The region of fifth-highest intensity (I5) is shown with a hatched (forward-slash, greater spacing) pattern. The regions of relatively high intensity in FIG. 4 are labeled as locations $L_1$, $L_2$ and $L_3$. Referring to FIGS. 1 and 4, the source of interest 20, the first background source 21 and the second background source 22 correspond generally to the locations $L_3$, $L_2$, $L_1$, respectively.

Per block 104 of FIG. 6, the first internal shield 30 is removed and the second internal shield 60 is placed in the housing 12. Per block 106 of FIG. 6, the assembly 10 may be re-positioned based at least partially on the first image and a second image is generated with the second internal shield 60 in the housing 12. The second field of view 70 is smaller than the first field of view 40 and is displaced relative to the first field of view 40 (assuming the assembly 10 is shifted). The assembly 10 may be displaced in any direction (see XYZ axes in FIG. 1). In the example shown, the assembly 10 is displaced along the negative Y direction. Referring to the example second image shown in FIG. 5, the region of highest intensity (I1) is spread over a limited region and the location $L_4$ of the source of interest 20 is visible. The method 100 provides a controllable field of view and reduces background source contamination in the image domain, as opposed to the spectral domain. Optionally, prior to generating the first image, an initial image with no shield in the housing 12 may be generated. This allows the user to know what is in the room and what needs to be avoided or focused on. The next measurement would be with a shield that is optimized/selected based on what was learned from the initial unshielded measurement.

Figure 7:
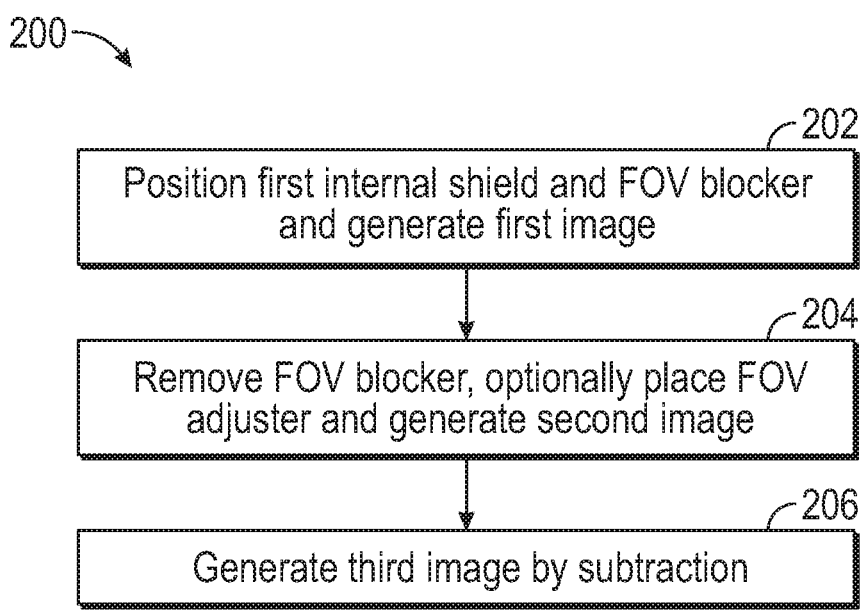
FIG. 7 is a flowchart for a method of controlling the assembly of FIG. 1, in accordance with a second embodiment.
Figure 8:
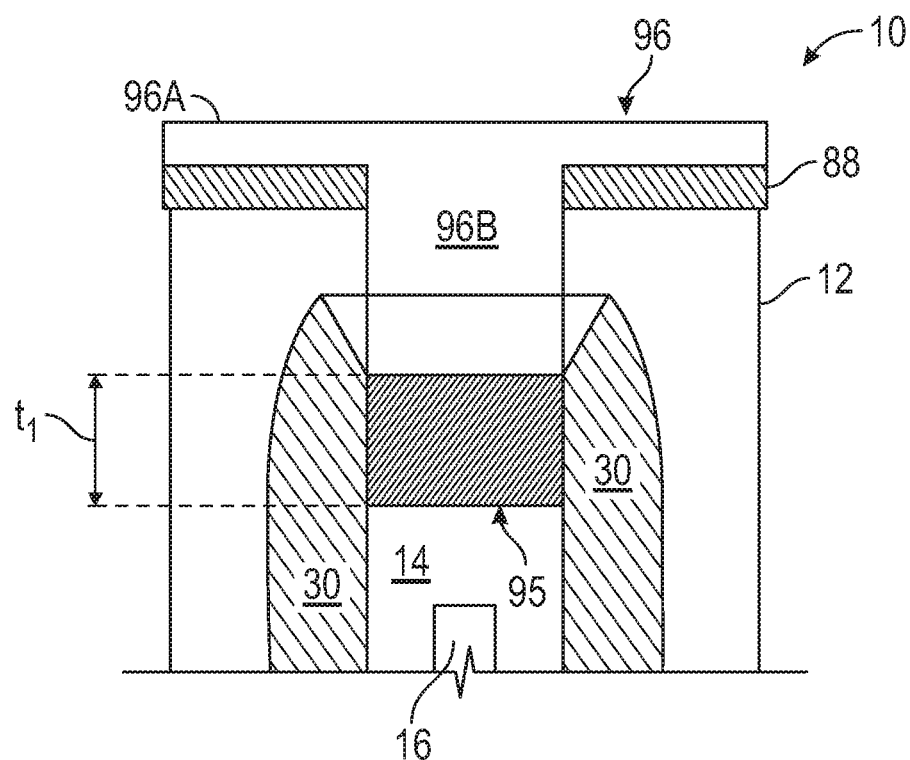
FIG. 8 is an example of a field of view (FOV) blocker employable in the assembly of FIG. 1.
Figure 9:
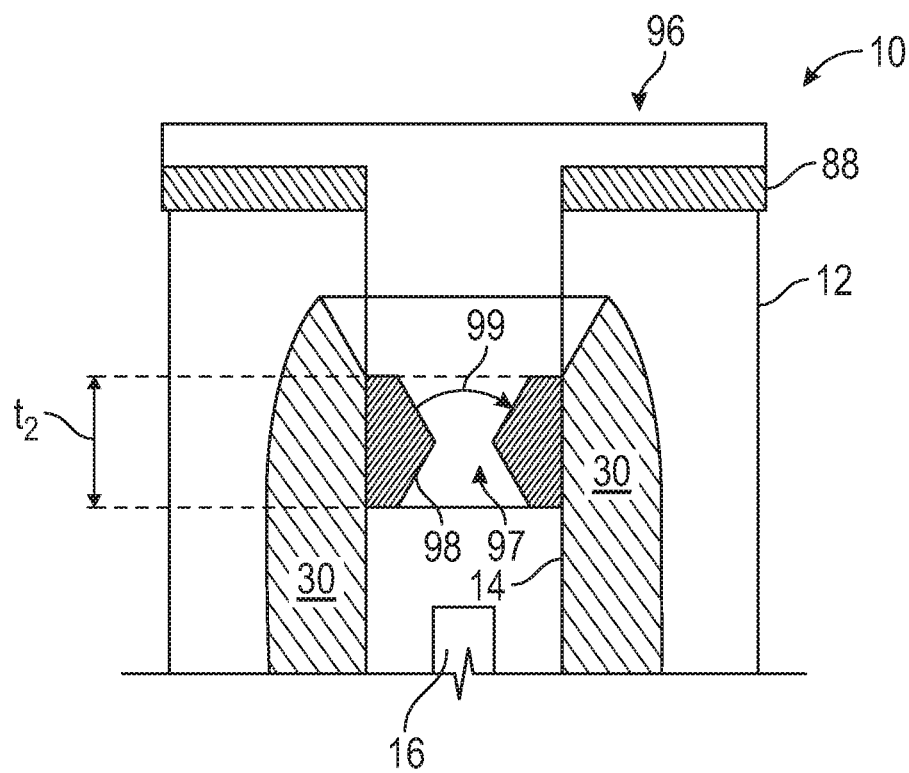
FIG. 9 is an example of a field of view (FOV) adjuster employable in the assembly of FIG. 1.

A second embodiment is illustrated with respect to FIGS. 7-9. FIG. 7 shows a method 200 of controlling the assembly 10, in accordance with the second embodiment. The method 200 need not take place in the order described and some steps may be omitted. Per block 202 of FIG. 7, a field of view (FOV) blocker 95 (see FIG. 8) is positioned in the cavity 14 of the housing 12 such that a combination of the first internal shield 30 and the FOV blocker 95 provides shielding in all directions. The FOV blocker 95 is composed of an attenuating material, including but not limited to, tungsten, lead or alloys of tungsten. The FOV blocker 95 defines a thickness ($t_1$) in a longitudinal direction. The thickness ($t_1$) of the FOV blocker 95 may be equal to the first fixed distance ($d_1$) (see FIG. 2) of the first internal shield 30 to allow uniform shielding in all directions.

Per block 202 of FIG. 7, a first image of a scene is generated with the FOV blocker 95 and the first internal shield 30 in place. By adding this field of view (FOV) blocker 40, uniform shielding is created in all directions. While in principle there should be no signal at all, in reality, some gamma-rays will leak through the field of view blocker 40 (approximately ⅟10 for a Co-60 source and less than that for most other sources). Therefore by measuring with the FOV blocker 95 installed, the background signal (in the spectrum and in the image) is obtained.

Per block 204 of FIG. 7, the FOV blocker 95 is removed, and a second image of the scene is generated with the first internal shield 30 but not the FOV blocker 95. This measurement captures the source of interest 20 as well as the background signal. By subtracting the data (in either the spectrum or the image domain) measured with the FOV blocker 95 installed from the data measured without the FOV blocker 95 installed, the signals from the source of interest 20 may be isolated. The first and the second images may be divided into respective bins having respective numeric values. For example, the radiation data may be divided into 180 by 360 bins, with each bin being about 1° by 1°. Per block 206 of FIG. 7, a third image is generated by subtracting the second image from the first image (i.e. subtraction of the respective numeric values in the respective bins).

Optionally, in block 204 of FIG. 7, a field of view (FOV) adjuster 97 may be positioned in the cavity 14 of the housing 12. Referring to FIG. 9, the FOV adjuster 97 has an opening defined by interior walls 98 such that a combination of the first internal shield and the FOV adjuster 97 limits the first field of view 40 (see FIG. 2) to an FOV angle 99. Then per block 208, a second image of the scene is generated with the FOV adjuster 97 and the first internal shield 30 but not the FOV blocker 95. As noted above, per block 210, a third image is generated by subtracting this second image from the first image (obtained in block 204, reflecting the background signal).

The FOV adjuster 97 is composed of an attenuating material, including but not limited to, tungsten, lead or alloys of tungsten. The thickness ($t_2$) of the FOV adjuster 97 may be equal to the first fixed distance ($d_1$) (see FIG. 2) of the first internal shield 30 for uniformity. The interior walls 98 of the FOV adjuster may be shaped as an hourglass. It is to be understood that the interior walls 98 may have a variety of shapes, including vertical.

If radiation levels are extremely high, most detectors do not function as well. The FOV adjuster 97 provides a technical advantage of reducing the total intensity falling on the sensor 16 while still allowing some of the source of interest 20 to pass directly through the hourglass-shaped opening so that the source strength may be accurately quantified. Additionally, the field of view for the assembly 10 is controllable and customizable by employing different FOV adjusters 97 with different respective FOV angles 99.

Referring to FIGS. 8-9, a support structure 96 may be employed to support positioning of the FOV blocker 95 and the FOV adjuster 97. The support structure 96 is composed of a non-attenuating material, such as polymers and plastics. In the embodiment shown in FIG. 8, the support structure 96 has a base portion 96A configured to rest on the front cover 88. The support structure 96 includes a flange portion 96B on which the FOV blocker 95 (in FIG. 8) and the FOV adjuster 97 (in FIG. 9) may be attached and entered into the cavity 14. It is to be understood that the shape of the support structure 96 may be selected based on the application at hand.

The controller C includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An imaging assembly comprising:
a housing having a cavity;
a sensor placed in the cavity and configured to detect radiation impinging on the sensor from a plurality of directions;
one or more shields arranged relative to the sensor, including a first internal shield having a first annular body between a first inner surface and a first outer surface;
a dual-function fixed shield operatively connected to the sensor and configured to at least partially attenuate a back radiation striking the dual-function fixed shield;
a first temperature regulator operatively connected to the sensor and configured to maintain the sensor at a predefined critical temperature, the dual-function fixed shield being configured to conduct heat away from the first temperature regulator;
wherein the first internal shield is configured to be placed in the housing such that the first inner surface at least partially surrounds the sensor;
wherein the sensor is configured to receive a first central zone radiation through a first field of view, and a first peripheral zone radiation through a first peripheral view, when the first internal shield is placed in the housing; and
wherein the assembly is configured to provide at least one of a controllable field of view and reduced background contamination in an image domain.

2. The assembly of claim 1, wherein:
the first peripheral zone radiation travels through the first annular body to reach the sensor; and
the first outer surface is tapered relative to the first inner surface such that the first peripheral zone radiation travels a first fixed distance ($d_1$) through the first annular body.

3. The assembly of claim 2, wherein:
the first internal shield defines a first edge line connecting an outermost edge point of the first inner surface and the sensor;
the first internal shield defines a first normal line extending from the sensor and perpendicular relative to the first inner surface;
the first field of view extends inside the first edge line; and
the first peripheral view extends between the first edge line and the normal line.

4. The assembly of claim 2, wherein:
the one or more shields includes a second internal shield interchangeably used with the first internal shield, the second internal shield having a second annular body between a second inner surface and a second outer surface;
the second internal shield is configured to be placed in the housing such that the second inner surface at least partially surrounds the sensor;
the sensor is configured to receive a second central zone radiation through a second field of view and a second peripheral zone radiation through a second peripheral view when the second internal shield is placed in the housing; and
the second field of view is smaller than the first field of view.

5. The assembly of claim 4, wherein:
the second peripheral zone radiation travels through the second annular body to reach the sensor;
the second outer surface of the second internal shield is tapered relative to the second inner surface such that the second peripheral zone radiation travels a second fixed distance ($d_2$) through the second annular body;
the second fixed distance ($d_2$) is greater than the first fixed distance ($d_1$);
the second internal shield defines a second edge line connecting an outermost edge point of the second outer surface and the sensor;
the second internal shield defines a second normal line extending from the sensor and perpendicular relative to the second inner surface;
the second field of view extends inside the second edge line; and
the second peripheral view extends between the second edge line and the normal line.

6. The assembly of claim 2, further comprising:
a removable sleeve having a sleeve annular body between a sleeve inner surface and a sleeve outer surface and configured to be placed over the first internal shield such that the sleeve inner surface is adjacent to and co-extensive with the first outer surface; and
wherein the removable sleeve is composed of a non-attenuating material.

7. The assembly of claim 6, wherein:
the first inner surface defines a first inner diameter ($ID_1$) and the second inner surface defines a second inner diameter ($ID_2$);
the removable sleeve, the first internal shield and the second internal shield define a sleeve lateral width (L), a first shield width ($W_1$) and a second shield width ($W_2$), respectively; and
a first summation ($S_1 = ID_1 + 2L + 2W_1$) of the first inner diameter ($ID_1$), twice the sleeve lateral width and twice the first shield width is equal to a second summation ($S_1 = S_2$) of the second inner diameter ($ID_2$) and twice the second shield width ($S_2 = ID_2 + 2W_2$).

8. The assembly of claim 1, further comprising:
a second temperature regulator operatively connected to the first temperature regulator.

9. The assembly of claim 1, wherein:
the one or more shields include a field of view (FOV) blocker positioned in the housing such that a combination of the first internal shield and the FOV blocker provides shielding in all directions.

10. The assembly of claim 1, wherein:
the one or more shields include a field of view (FOV) adjuster having an opening defined by interior walls and positioned in the housing; and
a combination of the first internal shield and the FOV adjuster limits the first field of view to an FOV angle.

11. The assembly of claim 10, wherein:
the FOV adjuster is composed of tungsten or an alloy of tungsten; and
the interior walls of the FOV adjuster are shaped as an hourglass.

12. A method of controlling an imaging assembly having a sensor placed in a housing, the method comprising:
positioning a first internal shield in the housing, the first internal shield having a first annular body between a first inner surface and a first outer surface such that the first inner surface at least partially surrounds the sensor;
wherein the sensor is configured to receive a first central zone radiation through a first field of view, and a first peripheral zone radiation through a first peripheral view, when the first internal shield is placed in the housing;
generating a first image with the first internal shield placed in the housing;
removing the first internal shield and positioning a second internal shield in the housing;
re-positioning the assembly based at least partially on the first image and generating a second image with the second internal shield in the housing;
wherein the sensor is configured to receive a second central zone radiation through a second field of view and a second peripheral zone radiation through a second peripheral view when the second internal shield is placed in the housing;
wherein the second field of view is smaller than the first field of view and the second peripheral zone radiation travels through a second annular body to reach the sensor;
wherein a second outer surface of the second internal shield is tapered relative to a second inner surface such that the second peripheral zone radiation travels a second fixed distance (d2) through the second annular body;
wherein the first peripheral zone radiation travels through the first annular body to reach the sensor; and
wherein the first outer surface is tapered relative to the first inner surface such that the first peripheral zone radiation travels a first fixed distance (d1) through the first annular body, the second fixed distance (d2) being greater than the first fixed distance (d1).

13. The method of claim 12, further comprising:
prior to generating the first image, generating an initial image with no shield in the housing.

14. The method of claim 12, further comprising:
prior to generating the first image, positioning a removable sleeve over the first internal shield, the removable sleeve having a sleeve annular body between a sleeve inner surface and a sleeve outer surface such that the sleeve inner surface is adjacent to and co-extensive with the first outer surface; and
wherein the removable sleeve is composed of a non-attenuating material.

15. The method of claim 14, wherein:
the first inner surface defines a first inner diameter ($ID_1$) and the second inner surface defines a second inner diameter ($ID_2$);
the removable sleeve, the first internal shield and the second internal shield define a sleeve lateral width (L), a first shield width ($W_1$) and a second shield width ($W_2$), respectively; and
a first summation ($S_1=ID_1+2L+2W_1$) of the first inner diameter ($ID_1$), twice the sleeve lateral width and twice the first shield width is equal to a second summation ($S_2=ID_2+2W_2$) of the second inner diameter ($ID_2$) and twice the second shield width ($S_1=S_2$).

16. The method of claim 12, further comprising:
positioning a field of view (FOV) blocker in the housing such that a combination of the first internal shield and the FOV blocker provides shielding in all directions; and
generating a first image of a scene with the FOV blocker and the first internal shield in place.

17. The method of claim 16, further comprising:
removing the FOV blocker and generating a second image of the scene with the first internal shield but not the FOV blocker;
wherein the first and the second images are each divided into respective bins having respective numeric values; and
generating a third image by subtracting the second image from the first image.

18. The method of claim 16, further comprising:
removing the FOV blocker and positioning a field of view (FOV) adjuster in the housing, the FOV adjuster having an opening defined by interior walls configured to limit the first field of view to an FOV angle;
generating a second image of the scene with the FOV adjuster and the first internal shield but not the FOV blocker;
wherein the first and the second images are each divided into respective bins having respective numeric values; and
generating a third image by subtracting the second image from the first image.

19. The method of claim 18, wherein:
the FOV adjuster and the FOV blocker are each composed of tungsten or an alloy of tungsten; and
the interior walls of the FOV adjuster are shaped as an hourglass.

20. An imaging assembly comprising:
a housing having a cavity;
a sensor placed in the cavity and configured to detect radiation impinging on the sensor from a plurality of directions;
one or more shields arranged relative to the sensor, including a first internal shield and a second internal shield interchangeably used with the first internal shield;
wherein the first internal shield has a first annular body between a first inner surface and a first outer surface such that the first inner surface at least partially surrounds the sensor when the first internal shield is placed in the housing;
wherein the sensor is configured to receive a first central zone radiation through a first field of view, and a first peripheral zone radiation through a first peripheral view, when the first internal shield is placed in the housing;

wherein the first peripheral zone radiation travels through the first annular body to reach the sensor;

wherein the first outer surface is tapered relative to the first inner surface such that the first peripheral zone radiation travels a first fixed distance ($d_1$) through the first annular body;

wherein the second internal shield has a second annular body between a second inner surface and a second outer surface such that the second inner surface at least partially surrounds the sensor when the second internal shield is placed in the housing;

wherein the sensor is configured to receive a second central zone radiation through a second field of view and a second peripheral zone radiation through a second peripheral view when the second internal shield is placed in the housing;

wherein the second field of view is smaller than the first field of view and the second peripheral zone radiation travels through the second annular body to reach the sensor;

wherein the second outer surface of the second internal shield is tapered relative to the second inner surface such that the second peripheral zone radiation travels a second fixed distance ($d_2$) through the second annular body; and the second fixed distance ($d_2$) is greater than the first fixed distance ($d_1$).

\* \* \* \* \*